United States Patent
Keng et al.

(10) Patent No.: US 8,496,212 B2
(45) Date of Patent: Jul. 30, 2013

(54) BIPOD ASSEMBLY WITH TERRAIN-GRIPPING END EFFECTERS

(75) Inventors: Da Keng, Smyrna, GA (US); Maciej W. Matuszczak, Woodstock, GA (US)

(73) Assignee: Keng's Firearms Specialty, Inc., Atlanta, GA (US)

( * ) Notice: Subject to any disclaimer, the term of this patent is extended or adjusted under 35 U.S.C. 154(b) by 0 days.

(21) Appl. No.: 11/330,290

(22) Filed: Jan. 12, 2006

(65) Prior Publication Data
US 2006/0278797 A1  Dec. 14, 2006

Related U.S. Application Data

(60) Provisional application No. 60/643,108, filed on Jan. 12, 2005.

(51) Int. Cl.
*F16M 11/38* (2006.01)

(52) U.S. Cl.
USPC ............... 248/166; 211/203; 248/168; 42/94

(58) Field of Classification Search
USPC .................. 248/188.8, 188.9, 508, 530, 166, 248/165, 168, 169, 170, 171; 52/155, 156, 52/165; 33/290, DIG. 21, 293; 42/94; 211/203, 211/207; 135/116, 118, 137; 396/419, 421, 396/427
See application file for complete search history.

(56) References Cited

U.S. PATENT DOCUMENTS

| | | | |
|---|---|---|---|
| 1,594,365 A | 8/1926 | Haubroe | |
| 1,919,554 A | 7/1933 | Howell | |
| 1,977,629 A | 10/1934 | Heavey | |
| 2,081,929 A | 6/1937 | Heavey | |
| 2,991,579 A | 7/1961 | Lies | |
| 3,006,052 A | 10/1961 | Stickney et al. | |
| 3,029,053 A | 4/1962 | Loehnis | |
| 3,782,243 A * | 1/1974 | Ziegler | 89/37.05 |
| 3,802,138 A | 4/1974 | McCarter | |
| 4,085,915 A | 4/1978 | Song et al. | |
| D276,588 S * | 12/1984 | Fambrough | D8/373 |
| 4,570,887 A | 2/1986 | Banister | |
| 4,903,425 A | 2/1990 | Harris | |
| 5,194,678 A | 3/1993 | Kramer | |
| 5,345,706 A | 9/1994 | Brown | |
| 5,815,974 A | 10/1998 | Keng | |
| 6,035,576 A * | 3/2000 | Bozeman | 47/47 |
| 6,763,627 B1 * | 7/2004 | Kaempe | 42/94 |
| 7,207,534 B2 * | 4/2007 | Crain et al. | 248/188.8 |
| 2002/0170253 A1 * | 11/2002 | MacKarvich | 52/292 |
| 2004/0004168 A1 * | 1/2004 | Crain et al. | 248/188.8 |
| 2004/0163336 A1 * | 8/2004 | Hsu | 52/157 |
| 2004/0227040 A1 * | 11/2004 | Crain | 248/188.8 |

* cited by examiner

*Primary Examiner* — Alfred J Wujciak
(74) *Attorney, Agent, or Firm* — Rodgers & Rodgers (57) ABSTRACT

A bipod comprises first and second tubular, spring-loaded telescopically extendable legs terminating distally in substantially triangular, claw-like end effectors. Each end effector includes a substantially planar central segment having an upper surface defining a polygon resembling a truncated triangle with the first, second and third corners projecting downwardly at an acute angle. The first second and third downwardly projecting corner segments define substantially planar, triangular claw members, and so form a cup-shaped three pointed claw ideally well suited to grasp but not sink into any terrain surface.

5 Claims, 12 Drawing Sheets

BIPOD ASSEMBLY WITH TERRAIN-GRIPPING END EFFECTERS

RELATED PATENT APPLICATION AND PRIORITY CLAIM INFORMATION

This application claims priority to and is owned by the applicant/owner of co-pending provisional application No. 60/643,108, filed Jan. 12, 2005, the entire disclosure of which is incorporated herein by reference. This application is also owned by the applicant/owner of U.S. Pat. No. 5,711,103 and U.S. Pat. No. 5,815,974, the entire disclosures of which are incorporated herein by reference. Additionally, this application is owned by the applicant/owner of provisional application No. 60/338,153, filed Nov. 13, 2001, the entire disclosure of which is also incorporated herein by reference.

BACKGROUND OF THE INVENTION

1. Field of the Invention

The present invention relates to an apparatus and method for supporting a firearm or other apparatus when in the field, and more particularly to a support device such as a bipod adapted to support the muzzle or stock of a firearm on snow, mud, soil, soft terrain, hard terrain or other surfaces.

2. Background of the Invention

When shooting firearms, especially in stressful tactical situations, it is important that the firearm be maintained in a steady, stable position to insure accuracy of aim. Most shooters are not able to hold a firearm consistently in a set position without wavering, especially after the onset of fatigue resulting from strain on the shooter due to the size and weight of the firearm.

Accordingly, peripheral support devices have been used in conjunction with firearms since the early creation of firearms as a means of stabilizing a firearm to reduce vibration, wavering, etc., and to improve accuracy.

In the past, shooters have used everything from large stationary objects such as rocks and tree branches to forked sticks, shooting slings, bipods and tripods. Early bipod and tripod supports typically were somewhat crude strands that generally were bulky, inconvenient and difficult to use and typically were not easily adjustable. In more recent times, bipod supports have been developed that are compact and relatively lightweight and are mountable to the forearm stock of a firearm, such as a rifle, to make the bipods portable with the firearm. Most conventional bipod supports include a pair of legs that can be pivoted from an up position adjacent the firearm stock, to a down position engaging a support surface, with the legs also being extensible to adjust the height of the support.

A problem with conventional bipods has been the tendency of the bipod's feet (or distal end surfaces) to slide along or sink into the ground or other soft supporting surface, unintentionally altering the shooter's point of aim.

Additionally, most bipods are not designed for quick and easy attachment and release of the bipod from the firearm stock. For example, U.S. Pat. No. 5,194,678 discloses a bipod assembly that includes legs that are pivotable independently of one another for ease of adjustment, but which is not easily attached/detached from the firearm. Other types of conventional bipods offer varying types of mountings that can be fitted to various types of rifles without requiring modification or machining of the rifle stock. Harris Engineering, Inc. manufactures a series of bipod mounts for use with a variety of different firearms. However, these bipod mounts do not provide for the quickly releasing an attached bipod support from the firearm.

One of the most popular bipods on the market has been the Parker-Hale bipod assembly. This bipod includes a pair of telescoping legs attached to a mounting frame, and a mounting block for mounting the bipod to the firearm. The mounting block of the Parker-Hale bipod is releasably attached to the mounting frame of the bipod to enable quick attachment/release of the legs of the bipod from the firearm. The problem with the Parker-Hale bipod is that to mount the bipod to a firearm, the forearm stock of the firearm generally must be modified to mount a track or slide therein, along which the mounting block is received to mount the bipod to the firearm. Such modifications generally are expensive and often must be done by specialty gunsmiths and can mar the finish of the firearm.

Military or police shooters using military or SWAT rifles often carry special mounts known as MIL-STD-1913 "picatinny" rails under the rifle forearm; the picatinny rails are customarily used for mounting grenade launchers, lights or other accessories and so the rifles often weigh much more than the lighter sporting arms most shooters are used to carrying.

Prior art bipods that have offered easy attachment still do not provide an adequate remedy for shooters who need a stable engagement with soft or uneven terrain, and so the detachable bipods of the prior art have proven unsuitable.

Accordingly, it can be seen that a need exists for a bipod mounting device for selectively attaching a bipod to a firearm adapted for use in military or SWAT situations, where the shooter may choose, for precision aiming, to have a stable support and stable engagement when placed soft, muddy or uneven terrain. Ideally, the attachment should not require extensive modification to the firearm such as machining of the forearm stock of the firearm.

SUMMARY OF THE INVENTION

The present invention comprises a bipod support for the forearm stock of a firearm such as a military rifle and includes first and second tubular, spring-loaded telescopically extendable legs terminating distally in substantially triangular, terrain gripping claw-like end effecters.

Each end effecter includes a substantially planar central segment having an upper surface defining a polygon resembling a truncated triangle with the first, second and third corners projecting downwardly at an acute angle (e.g., downwardly at an angle of approximately 80 degrees, relative to the plane of the upper surface) to define a dirt-compacting cup shaped periphery functioning as a snow, slush, mud or dirt flow impeding "drag-chute" effect generator. The claws terminate in depending points which dig into and hold ice and other harder surfaces.

Each end effecter has a substantially planar lower surface opposite the upper surface and defining a polygon having first, second and third downwardly angled claws or corner walls which appear to be foreshortened when viewed from below. More specifically, each end effecter defines a six-sided polygon having long sides (approximately 3 cm) alternating with three short sides (approximately 1 cm) carrying first, second and third downwardly projecting corner segments to define substantially planar, triangular claw members. Preferably, the claw members project downwardly at an angle of approximately 120 degrees from the plane of the lower surface, and so form a cup-shaped three pointed claw member ideally well suited to grasp but not sink into any terrain surface, even under substantial loads.

Each bipod leg is affixed to the end effector's upper surface, preferably in a substantially cylindrical receiving socket integrally formed in the end effector's upper surface and having a central axis inclined at a selected angle (e.g., 60 degrees) from the plane of the end effector's upper surface.

In an illustrative embodiment, the present invention is directed to use for mounting a firearm bipod of the type including a mounting block with an integral clamp assembly affixed beneath the forearm stock of the firearm. The mounting block is releasably attachable to a bipod mounting frame. The bipod mounting frame includes a pair of extensible/retractable legs, each having a pair of telescoping sections to enable the height of the bipod to be adjustable as desired.

The resulting attachment of the clamp assembly to the forearm stock provides a quick and easy attachment of the bipod to the firearm (or some other instrument requiring support) and enables the assembly to mount securely in a stable, secure selected position. This prevents the bipod, from shifting fore and aft or wobbling during use.

With the assembly securely mounted to the forearm stock of the firearm, the attached bipod frame is placed in locking engagement with the firearm. Optionally, a detachable sling loop can be provided with the clamp assembly for attachment of a rifle sling to the stock of the firearm (not shown).

Various objects, features and advantages of the present invention will become apparent to one skilled in the art upon a review of the following specification, when taken in conjunction with the accompanying drawings.

DETAILED DESCRIPTION OF A PREFERRED EMBODIMENT

Referring now to FIGS. 1a-14h in which like numerals indicate like parts throughout the several views, the present invention comprises, in a first embodiment, a bipod assembly 10 adapted to support a firearm such as a rifle or another instrument when in the field.

Bipod support assembly 10 is configured to be releasably affixed to or mounted upon the forearm stock of a firearm such as a military rifle and includes first and second two-part, coaxially nested, tubular, spring-loaded telescopically extendable legs 14, 18 terminating distally in first and second substantially triangular, claw-like end effectors 22, 26.

Each end effecter (e.g., 26, best seen in FIGS. 5a-5d) includes a substantially planar central segment 30, having an upper surface 32 defining a polygon resembling a truncated triangle with the first, second and third radially arrayed corners or claws 40, 42, 44 projecting downwardly at an acute angle (e.g., downwardly at an angle of approximately 80 degrees, relative to the plane of upper surface 32) to define a dirt compacting cup-shaped periphery. The claws 40, 42, 44 terminate in depending points which dig into and hold ice, asphalt and other hard surfaces and each includes angular planar triangular abutting wall segments 46 and 48. As shown in FIG. 5C, the abutting edges of wall segments 46 and 48 extend outwardly of claws 40, 42 and 44.

Figure 5A:
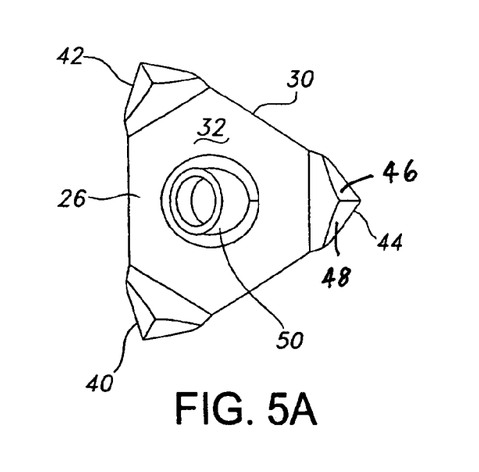
FIGS. 5a-5d illustrates end effecter of the bipod assembly of FIGS. 1a-1d, in accordance with the present invention.
Figure 5B:
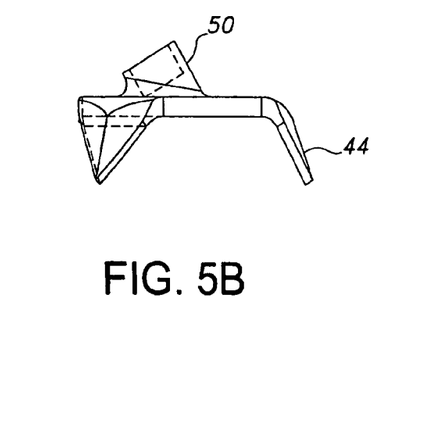
Figure 5C:
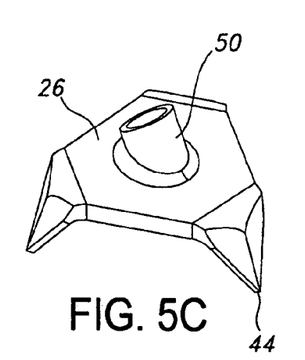
Figure 5D:
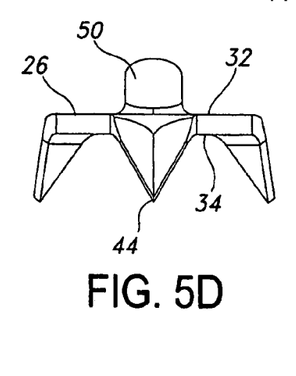

Each end effecter 22, 26 has a substantially planar lower surface 34 opposite the upper surface and defining a polygon having first, second and third downwardly angled claws or corner walls which appear to be foreshortened when viewed from above, as best seen in FIG. 5a. More specifically, each end effecter preferably defines a six-sided polygon having long sides (approximately 3 cm) alternating with three short sides (approximately 1 cm) carrying first, second and third downwardly projecting corner segments to define substantially planar, triangular claw members. Preferably, the claw members project downwardly at an of approximately 120 degrees from the plane of the lower surface, and so form a cup-shaped three pointed claw member ideally well suited to grasp but not sink into any terrain surface, even under substantial loads.

Each bipod leg 14, 18 is affixed to the end effectors upper surface, preferably in a substantially cylindrical receiving socket 50 integrally formed in the end effector's upper surface 32 and having a central axis inclined at a selected angle (e.g., 60 degrees) from the plane of the end effector's upper surface.

In an illustrative embodiment, the present invention is directed to use for mounting a firearm bipod of the type including a mounting block with an integral clamp assembly affixed beneath the forearm stock of the firearm. The mounting block is releasably attachable to a bipod mounting frame. The bipod mounting frame includes a pair of extensible/retractable legs, each having a pair of telescoping sections to enable the height of the bipod to be adjustable as desired.

The resulting attachment of the clamp assembly to the forearm stock provides a quick and easy attachment of the bipod to the firearm (or some other instrument requiring support) and enables the assembly to mount securely in a stable, secure selected position. This prevents the bipod from shifting fore and aft or wobbling during use.

With the assembly securely mounted to the forearm stock of the firearm, the attached bipod frame is placed in locking engagement with the firearm. Optionally, a detachable sling loop can be provided with the clamp assembly for attachment of a rifle sling to the stock of the firearm (not shown).

If needed, the bipod legs 14, 18 can be folded into a raised, closed non-operative position when not in use (e.g., as in FIG. 1a), and are latched in the retracted position until released and extended by operation of a spring to an operative, open ground engaging position (e.g., as in FIG. 2a) when needed.

Figure 5E:
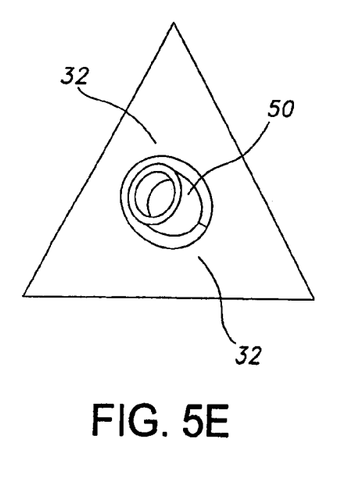
FIG. 5e illustrates a planar, un-folded triangular blank used to make the end effecter of the bipod assembly of FIGS. 1a-1d, in accordance with the present invention.
Figure 6A:
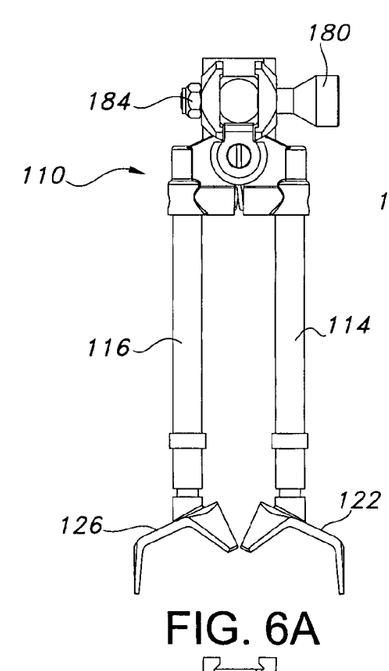
FIGS. 6a-6e illustrate a second embodiment of the bipod assembly showing the first and second extendable legs in the together, locked or closed position, in accordance with the present invention.
Figure 6B:
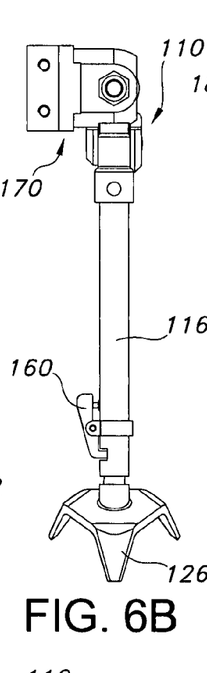
Figure 6C:
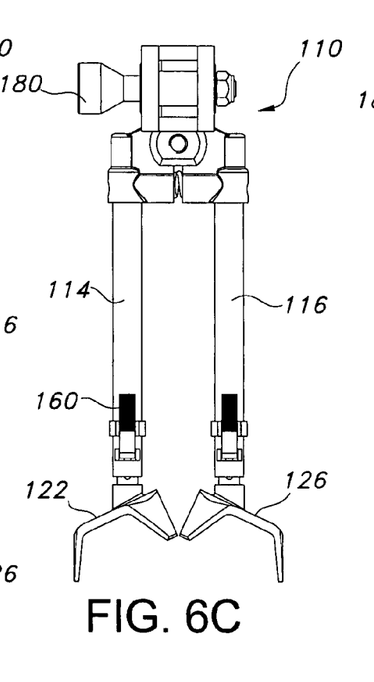
Figure 6D:
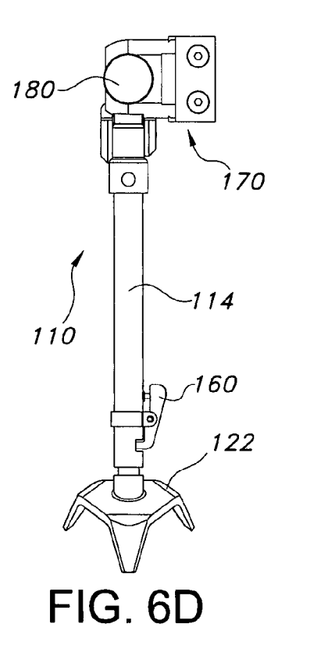
Figure 6E:
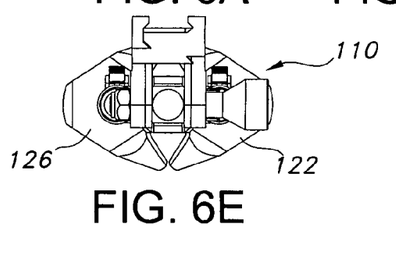
Figures 7A, 7B, 7C, 7D:
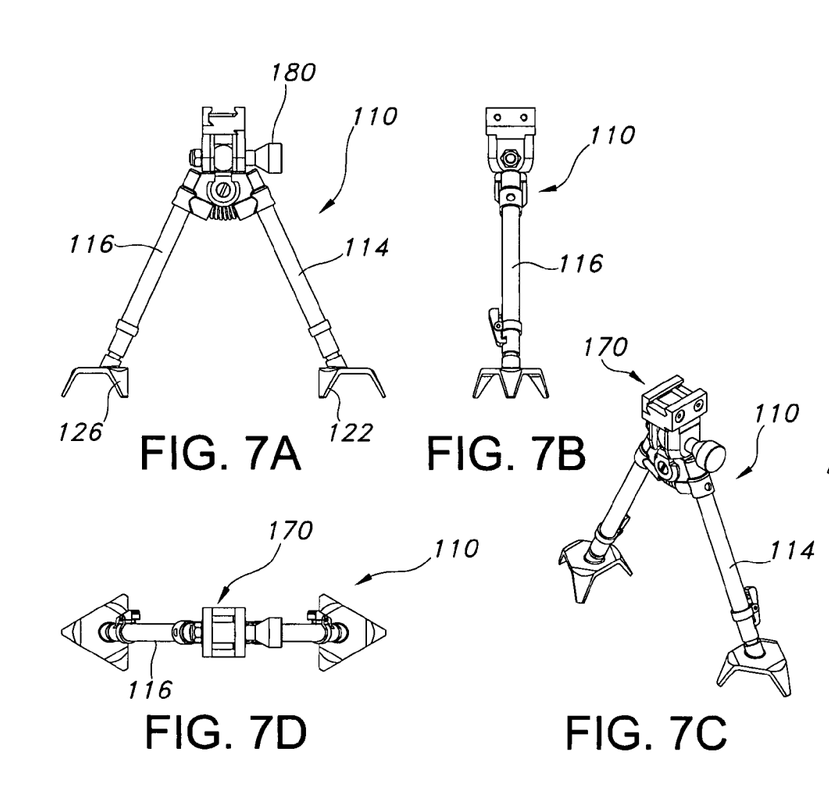
FIGS. 7a-7d illustrate the bipod assembly of FIGS. 6a-6e, showing the first and second extendable legs in the spread-apart, un-locked or open position, with the extendable legs retracted, in accordance with the present invention.
Figures 8A, 8B:
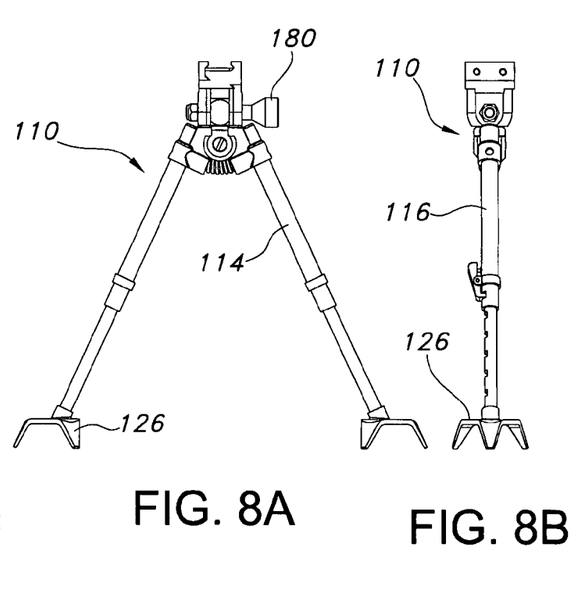
FIGS. 8a and 8b illustrate the bipod assembly of FIGS. 6a-6e, showing the first and second extendable legs in the spread-apart, un-locked or open position, with the extendable legs extended, in accordance with the present invention.
Figure 9A:
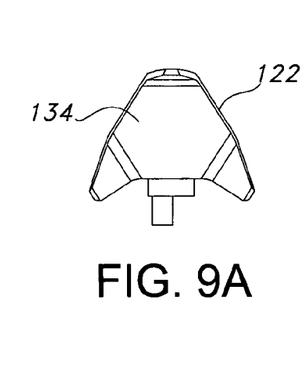
FIGS. 9a and 9b illustrate top and bottom views of an extendable left bipod leg assembly from the bipod assembly of FIGS. 6a-6e, in accordance with the present invention.
Figure 9B:
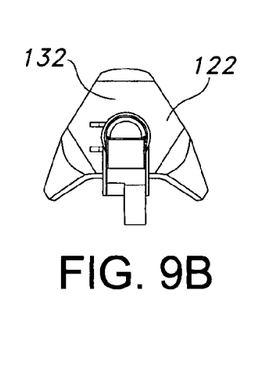
Figure 10A:
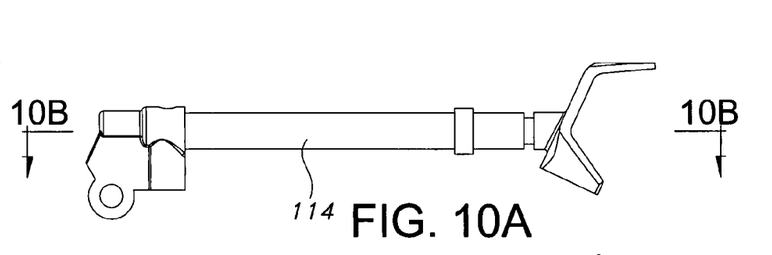
FIGS. 10a-10d illustrate a left bipod leg assembly from the bipod assembly of FIGS. 6a-6e, showing, in front and side views and in cross sections, the extendable leg in the retracted position, in accordance with the present invention.
Figure 10B:
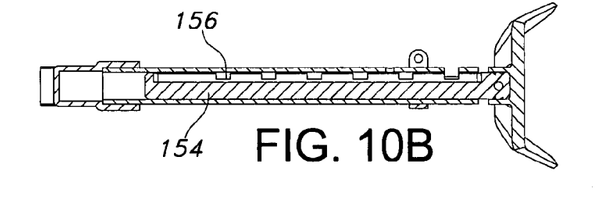
Figure 10C:
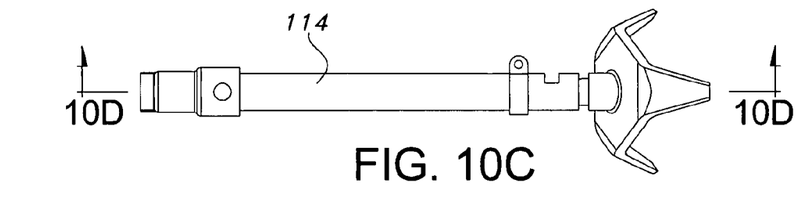
Figure 10D:
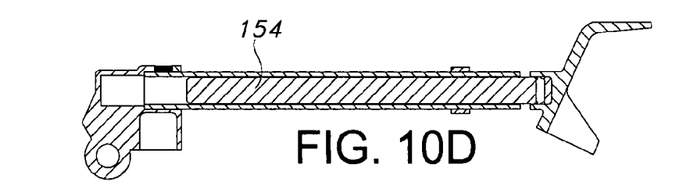
Figure 11A:
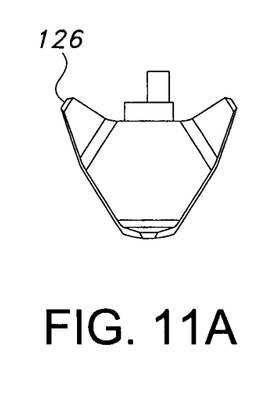
FIGS. 11a-11f illustrate top, bottom, front, side and cross section views of the right extendable leg assembly in the retracted position, in accordance with the present invention.
Figure 11B:
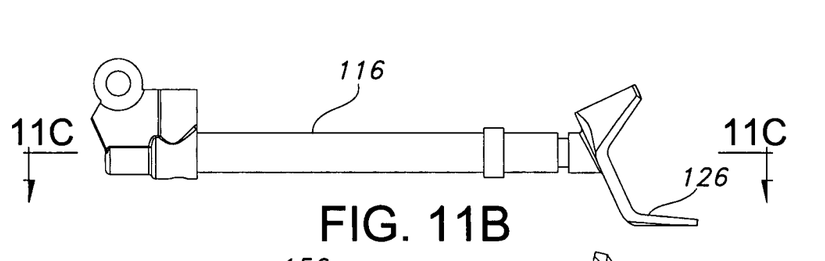
Figures 11C, 11D:
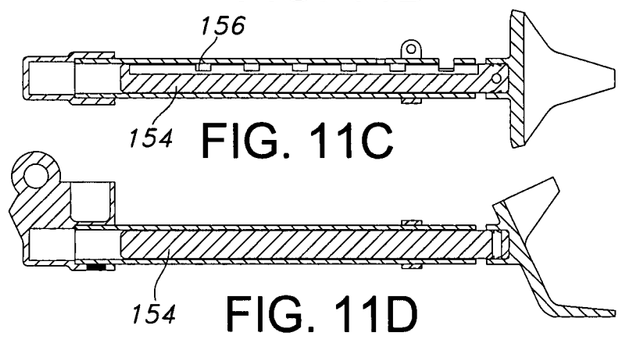
Figure 11E:
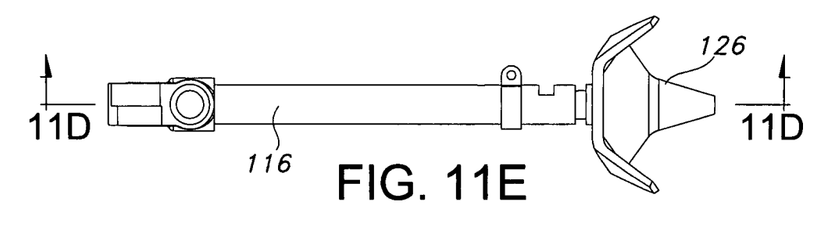
Figure 11F:
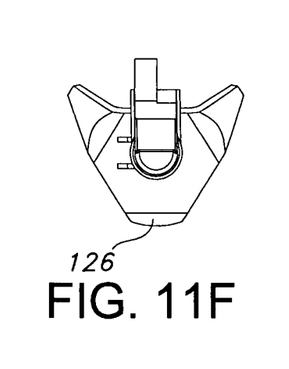
Figure 12:
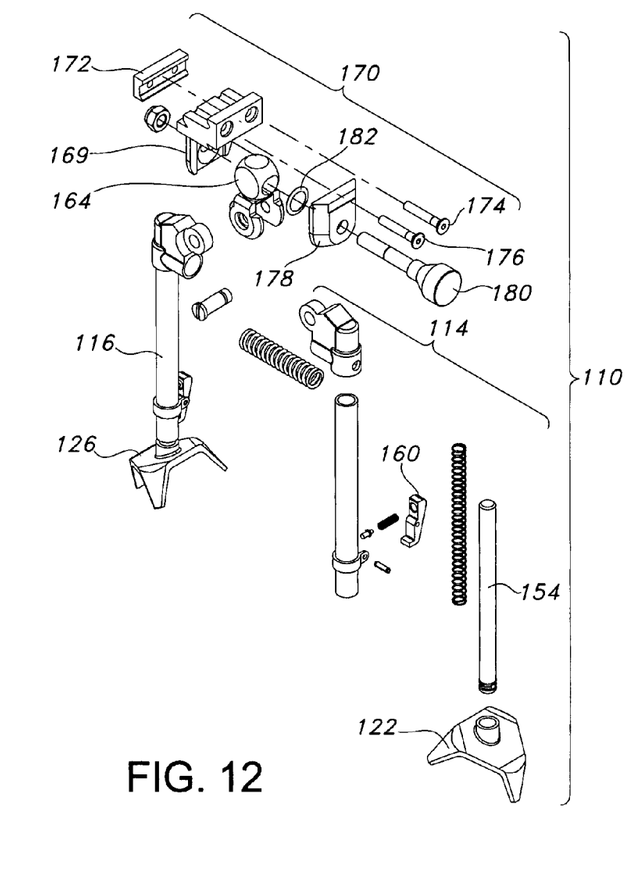
FIG. 12 illustrates an exploded perspective view of the bipod assembly of FIGS. 6a-6e, in accordance with the present invention.
Figures 13A, 13B, 13C, 13D, 13E, 13F, 13G, 13H:
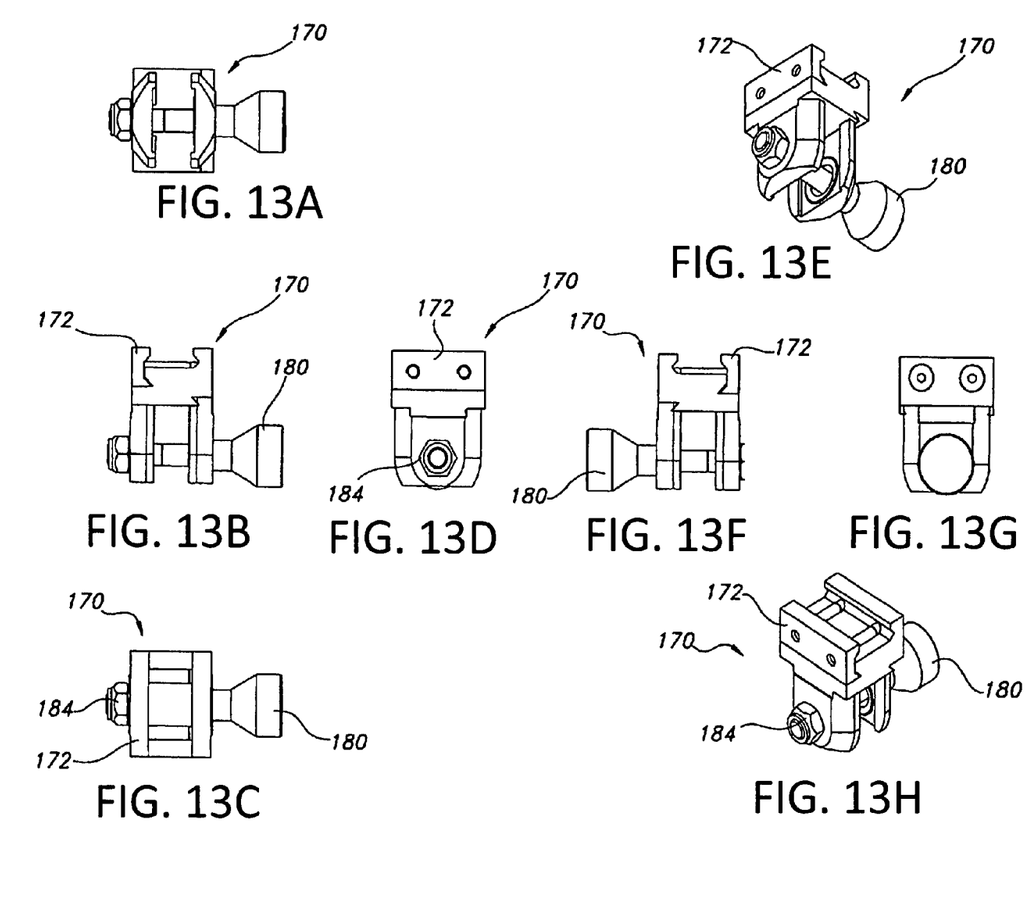
FIGS. 13a-13h illustrate the head assembly for the bipod assembly of FIGS. 6a-6e, in accordance with the present invention.

FIG. 5e illustrates a planar, un-folded triangular blank; this triangular blank is, optionally, cut to shape and is used to make the end effecter of the bipod assembly of FIGS. 1a-1d. The blank is optionally stamped to make the bends shown in FIGS. 5a-5d.

In accordance with the present invention, a second embodiment, illustrated in FIGS. 6a-14h includes an alternative embodiment for the end effecters and claws as well as an adjustable clamping mechanism adapted to securely fasten the bipod assembly 110 to the forearm of a rifle or other weapon (e.g. such as an M-249 Squad Automatic Weapon "SAW") as might be used, for example, by the military.

Clamping Bipod assembly 110 includes first and second extendable bipod legs 114,116 terminating distally in first and second claw-shaped end effecters 122, 126. Each of the end effecters includes a substantially planar central segment 130 having an upper surface 132 opposite a substantially planar lower surface 134. Each end effecter (for example, end effecter 126) is shaped as a triangle having drooping corners to define radially arrayed downwardly depending claw members as shown in the figures. A first claw 140 is spaced at an equal angle (120° apart) from second claw member 142 and third claw member 144. Each of the claw members is terminated in a substantially linear edge 146 and defines an angled sidewall to grasp and compact the earth or snow when the bipod's end effecter is pressed on e.g., the ground's surface. Each of the end effecters 122, 126 carries on its upper surface an angled receiving socket 150 adapted to receive the distal end of the extendable bipod leg (e.g. 114 or 116).

Each extendable leg is made of a coaxially aligned solid rod member 154 including a plurality of evenly spaced transverse graduations or notches 156 adapted to be engaged by hinged and spring bias locking member 160. The substantially rectangular distal edge of locking member 160 is dimensioned to exactly fit a selected transverse notch 156 in the solid rod member 154. The solid rod member 154 is received in carried within the rigid tubular upper bipod member carrying the locking mechanism. The locking mechanism terminates proximately or at its upper end in the bipod assembly hinged support carrying the ball connector 164 which, in turn, is releasably clamped into a selected orientation in the head assembly 170.

Clamping bipod assembly 110 includes, as part of head assembly 170 an upward facing groove or channel adapted to receive a picatinny rail or similar longitudinal mounting rail. The right side wall of the head assembly mounting groove is preferably configured as a longitudinal clamping member 172 that includes, preferably, first and second aligned transverse threaded bores adapted to receive first and second transverse threaded fasteners 174, 176 which, upon loosening, allow the head assembly 170 to be slidably engaged with a picatinny rail mounted on the underside of a firearm's forearm (not shown) and then tightened to clamp bipod assembly 110 onto the firearm or other instrument.

Head assembly 110 also includes an orientation adjustment and orientation fixing clamp including a head assembly stationary strut 169 which opposes a movable clamping jaw surface on an opposing movable strut 178. A threaded position fixing clamping fastener 180 terminates proximally in an easy to grasp knob and has a substantially cylindrical shaft carrying threads extending to the distal tip opposing the knob. Clamping fastener 180 is optionally held in place by a threaded nut 184. Clamping fastener is also received through and threadably engages a transverse threaded bore in stationary strut 169, passing thru an unthreaded swaged transverse bore through ball connector 164 and an aligned unthreaded transverse bore in movable strut 178. Preferably, a belleville washer 182 is placed between ball connector 164 and the clamping surface of movable strut 178. Clamping fastener 180 includes a distally facing shoulder of larger diameter than the movable strut's transverse bore, so that as clamping fastener 180 is tightened, the threaded clamping fastener's proximal knob is drawn distally toward ball connector 164 via the threads within the stationary strut's bore, eventually crushing washer 182 and clamping the movable strut against the ball connector, to fix the orientation of bipod assembly 110 in a selected aiming orientation.

Figure 1A:
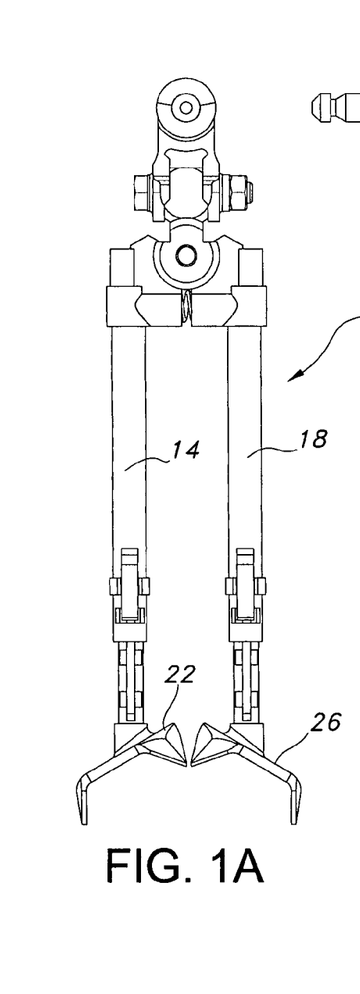
FIGS. 1a-1d illustrate a first embodiment of the bipod assembly showing the first and second extendable legs in the together, locked or closed position, in accordance with the present invention.
Figures 1B, 1C:
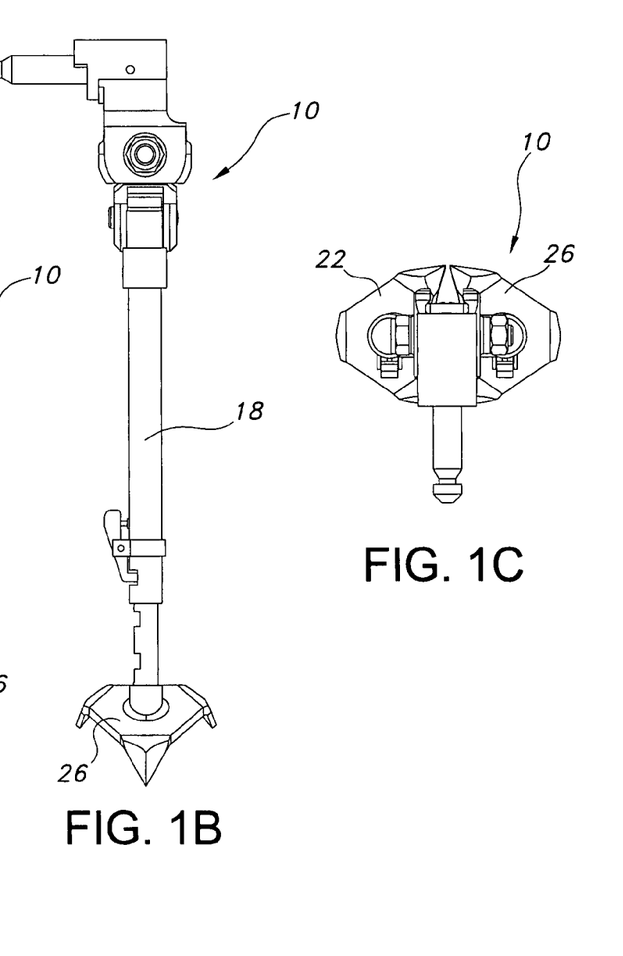
Figure 1D:
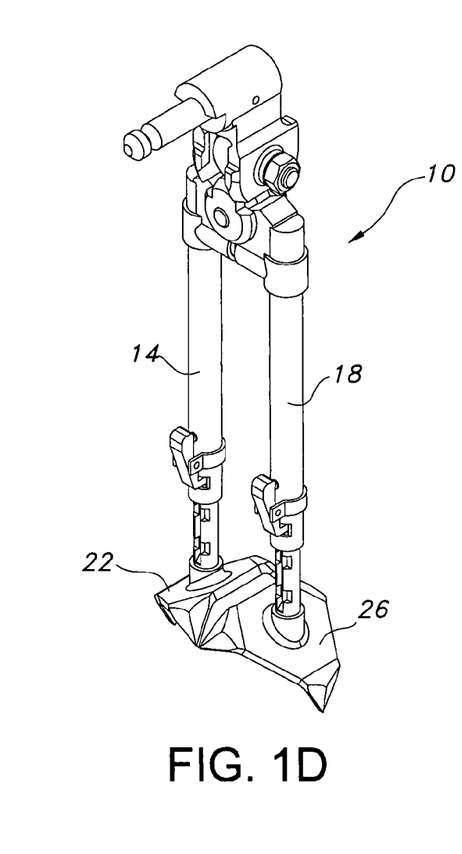
Figure 2A:
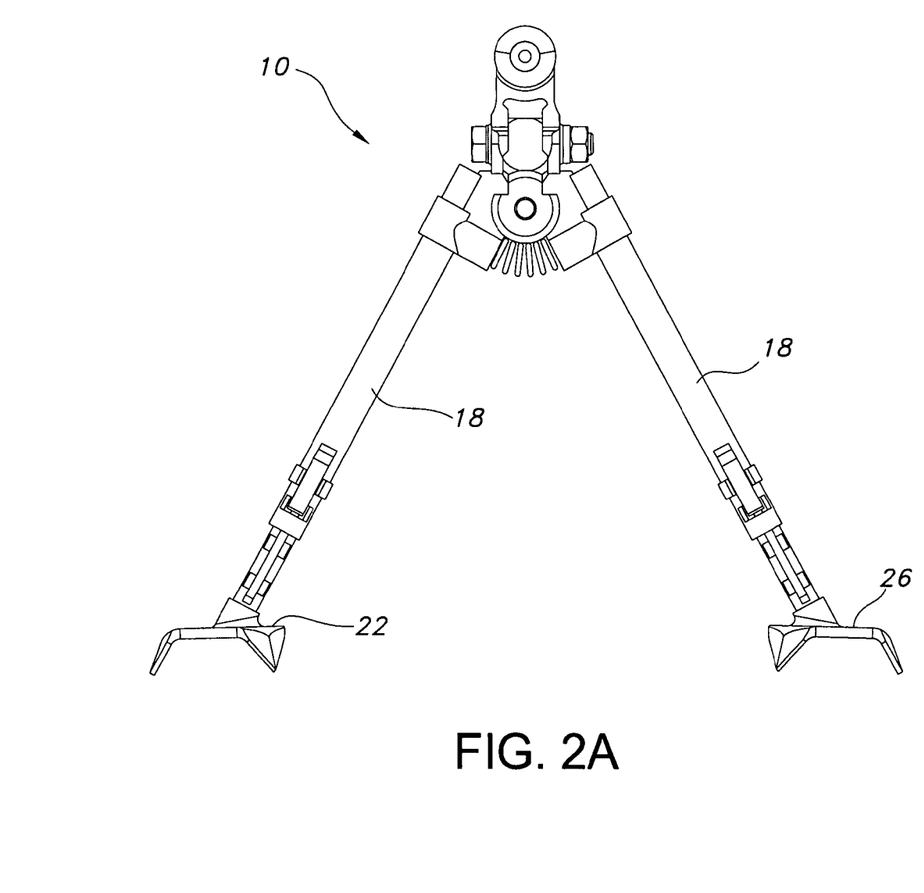
FIGS. 2a-2b illustrates the bipod assembly of FIGS. 1a-1d, showing the first and second extendable legs in the spread-apart, un-locked or open position, in accordance with the present invention.
Figure 2B:
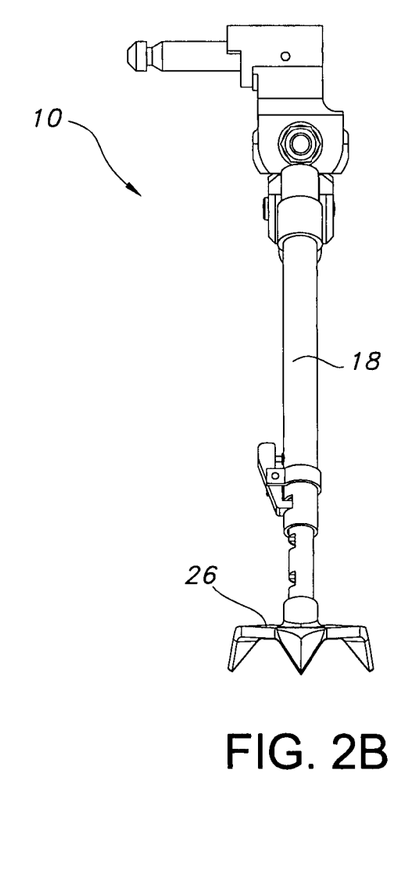
Figures 3A, 3B:
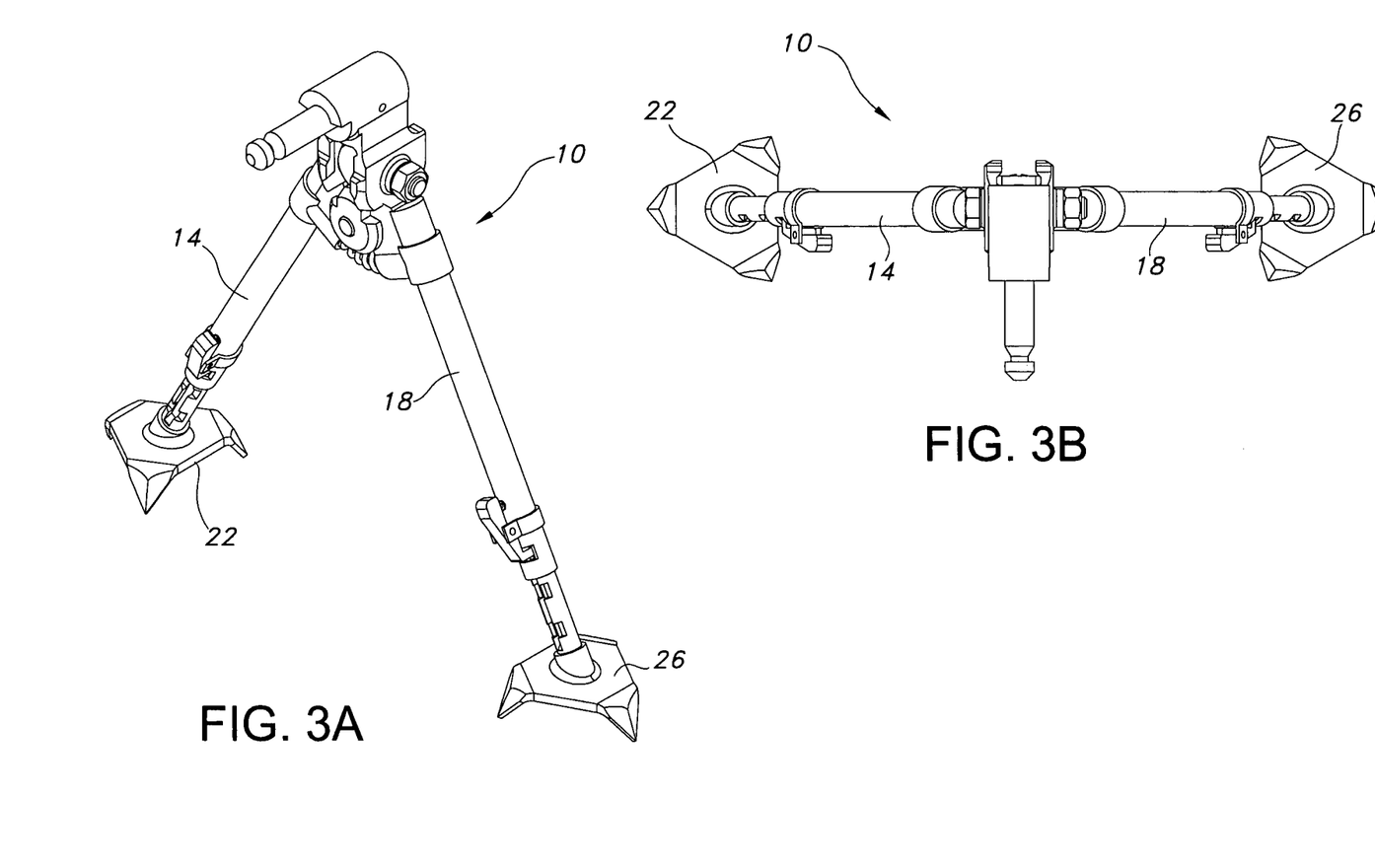
FIGS. 3a-3b are top and rear perspective views illustrating the bipod assembly of FIGS. 1a-1d, showing the first and second extendable legs in the spread-apart, un-locked or open position, in accordance with the present invention.
Figure 4:
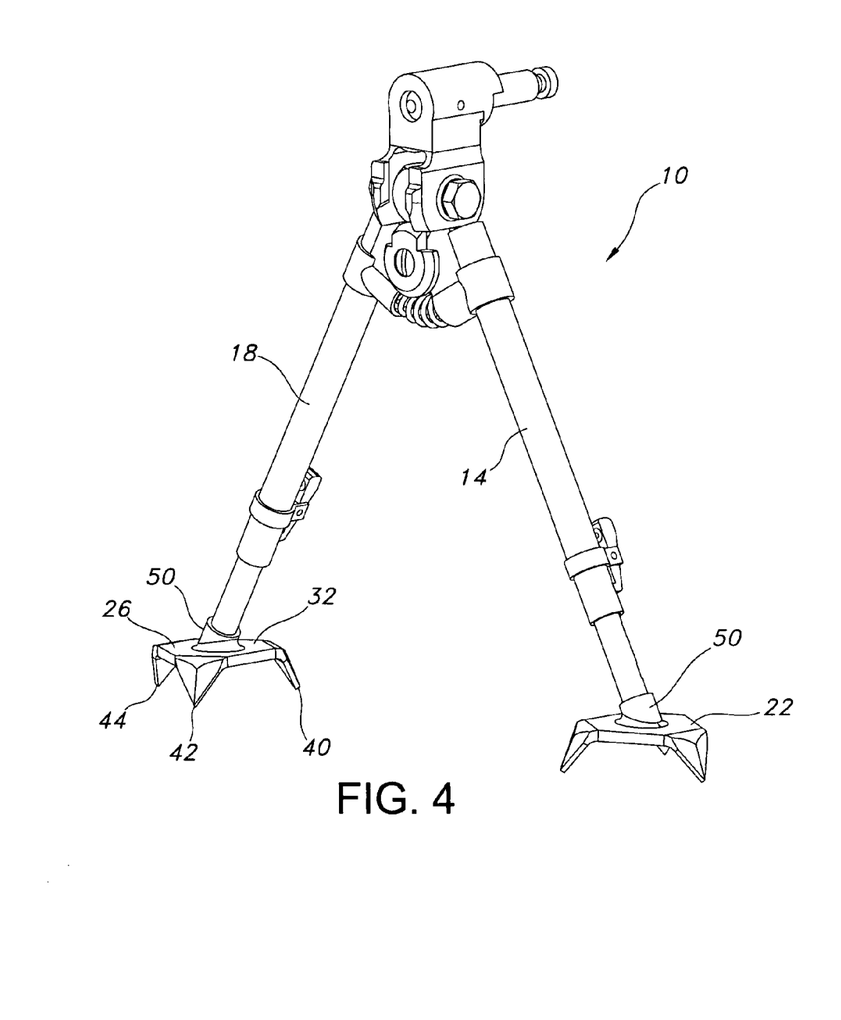
FIG. 4 is a front perspective view illustrating the bipod assembly of FIGS. 1a-1d, showing the first and second extendable legs in the spread-apart, un-locked or open position, in accordance with the present invention.

The bipod assemblies disclosed above are preferably fabricated from durable, tough, resilient materials such as steel, aluminum, titanium or other metals, but components can advantageously be made from other materials including fiber reinforced polymers. The first and second embodiments of the end effectors, (e.g., 22 and 122, respectively) can be fabricated from triangular blanks made of 4130 steel alloy or an equivalent, and then the downwardly projecting claw members are fashioned by bending or breaking the individual corner terminations into selected downward angles of, preferably, 45 to 85 degrees from the horizontal plane of the central segment's upper surface. In the embodiment illustrated in, e.g., FIG. 1, the claws are arrayed at 60 degrees down from the plane of the central segment's upper surface, to form the peripheral compacting cup shape. Put another way, the claws are arrayed at 120 degrees out from the plane of the central segment's lower surface.

Figure 14A:
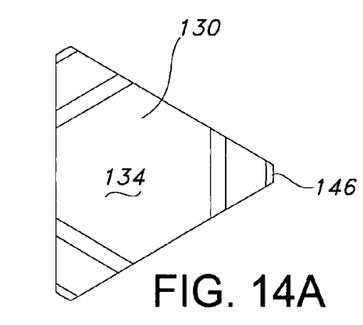
FIGS. 14a-14h illustrate the terrain-gripping end effecter for the bipod assembly of FIGS. 6a-6e, in accordance with the present invention.
Figure 14B:
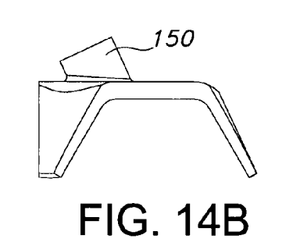
Figure 14C:
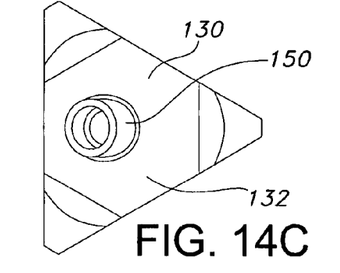
Figure 14D:
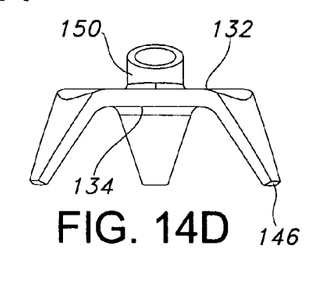
Figure 14E:
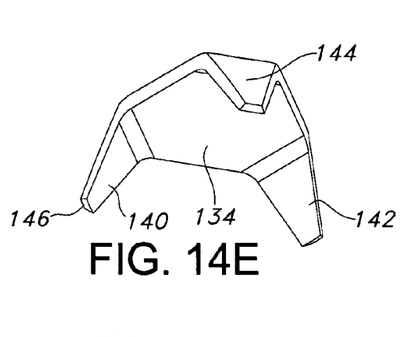
Figure 14F:
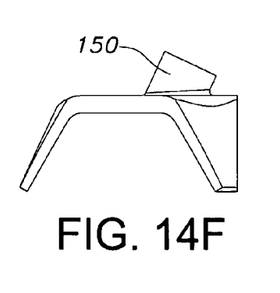
Figure 14G:
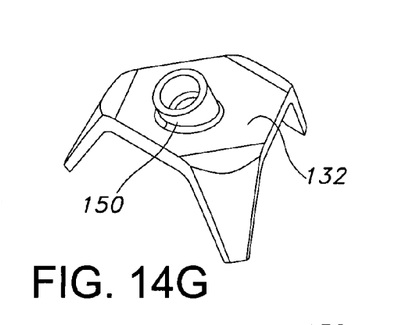
Figure 14H:
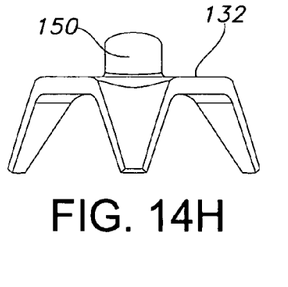

The embodiments illustrated include bipod end effectors with an array of three spaced downwardly depending angled wall segments terminating in distal points (as in, e.g., FIG. 1) or distal edges (as in, e.g., FIG. 14) configured to engage the ground's surface while compressing or compacting the engaged surface material (e.g., soil, mud slurry, snow or ice) within an angled cup-like side wall periphery. The rapid and stable ground engaging end effecter of the present invention (e.g., either 22 or 126) is useful in other portable support configurations such as monopods or tripods for a rapid and stable ground engaging support which prevents having the distal end of the support from sinking into the engaged surface, and could be attached by a ball swivel connection (not shown) rather than via an angled socket (e.g., 150) as in the bipod embodiments.

The term "end effecter" (e.g., either 22 or 126), for purposes of nomenclature, means the structural element that is engaged with the ground to provide stability and so should be read to broadly include any support termination member engaging the ground with downwardly projecting angled or cup-shaped wall segments configured to laterally compress and compact the surface material engaged when placing the end effecter on the ground, and so can include any combination of straight or curved wall segments or downwardly projecting truncated corners, in an array of two or more segments oriented to define a captive volume there between and, under load, laterally force the compacted material (e.g., soil, mud or snow) engaged into compressive contact with the bottom surface of the end effecter.

Further, it will be understood by those skilled in the art that while the present invention has been disclosed for use primarily with a Parker-Hale style firearm bipod assembly, the present invention also can be used for mounting the types of bipods having a bipod leg frame that is releasably mountable to a mounting block for a firearm.

It will be understood that while the foregoing relates to preferred embodiments of the invention, various modifications, additions and changes may be made thereto without departing from the spirit and scope of the invention, and that the scope of the invention is limited only by the claims.

What is claimed is:

1. A bipod assembly comprising:
   (a) a clamp body mounted on first and second bipod legs for supporting a firearm, said first and second bipod legs having a proximal end hingedly attached to said clamp body;
   (b) said first and second bipod legs each having a distal end opposing said proximal end, wherein said distal end carries an end effecter;
   (c) said end effecter comprising a central substantially planar six-sided polygon central segment of a truncated triangle shape having alternating short and long sides from which depend first, second and third radially spaced triangular claw members;
   (d) said short sides defining truncated tips;
   (e) said first, second and third claw members depending downwardly respectively from said short sides at a selected angle substantially 80 degrees from horizontal when said central segment is in a substantially horizontal orientation to define a cup-shaped three pointed surface engaging support configured to grasp and laterally compress, but not sink into a terrain surface;
   (f) said claw members defining a pair of triangular angularly disposed wall segments having abutting edges depending from said short sides and terminating in a point; and
   (g) said abutting edges of each claw member spaced outwardly from said claw member beyond an imaginary vertical plane intersecting said short side.

2. A bipod assembly of claim 1, wherein said claw members terminate distally in pointed distal ends.

3. A bipod assembly of claim 1, wherein said claw members terminate distally in wall segment distal linear edges.

4. A bipod assembly of claim 1, wherein said end effecter is made of metal.

5. A bipod assembly of claim 4, wherein said metal comprises steel.

\* \* \* \* \*